US008946946B2

(12) United States Patent
Andresen et al.

(10) Patent No.: US 8,946,946 B2
(45) Date of Patent: Feb. 3, 2015

(54) CONVERTER DEVICE AND METHOD FOR CONVERTING ELECTRICAL POWER (75) Inventors: Björn Andresen, Ostbirk (DK); Steffen Wulff, Bremen (DK)

(73) Assignee: Siemens Aktiengesellschaft, Munich (DE)

( * ) Notice: Subject to any disclaimer, the term of this patent is extended or adjusted under 35 U.S.C. 154(b) by 472 days.

(21) Appl. No.: 13/005,854

(22) Filed: Jan. 13, 2011

(65) Prior Publication Data

US 2011/0176342 A1    Jul. 21, 2011

(30) Foreign Application Priority Data

Jan. 14, 2010 (EP) ..................................... 10000320

(51) Int. Cl.
G05F 3/06 (2006.01)
H02J 3/18 (2006.01)
H02J 3/38 (2006.01)

(52) U.S. Cl.
CPC . *H02J 3/18* (2013.01); *H02J 3/383* (2013.01); *H02J 3/386* (2013.01); *Y02E 10/763* (2013.01); *Y02E 40/30* (2013.01); *Y02E 10/563* (2013.01)
USPC .................. 307/151; 290/44; 290/55; 363/55

(58) Field of Classification Search
CPC ..... Y02E 10/723; Y02E 10/725; F03D 9/003; H02J 3/382

USPC ........................... 307/151; 290/44, 55; 363/55
See application file for complete search history.

(56) References Cited

U.S. PATENT DOCUMENTS

| 6,448,735 | B1 | 9/2002 | Gokhale et al. |
| 2004/0178639 | A1 | 9/2004 | Wobben |
| 2006/0214428 | A1 * | 9/2006 | Altemark et al. ............... 290/44 |
| 2008/0106100 | A1 * | 5/2008 | Hyvarinen ..................... 290/44 |
| 2008/0284252 | A1 * | 11/2008 | Jones et al. ..................... 307/82 |
| 2009/0001725 | A1 * | 1/2009 | Llorente Gonzalez et al. . 290/44 |
| 2009/0322081 | A1 * | 12/2009 | Wagoner et al. ................ 290/44 |
| 2009/0322082 | A1 * | 12/2009 | Wagoner et al. ................ 290/44 |
| 2009/0322083 | A1 * | 12/2009 | Wagoner et al. ................ 290/44 |
| 2010/0176770 | A1 * | 7/2010 | Fortmann ...................... 323/205 |
| 2010/0314872 | A1 * | 12/2010 | Wagoner et al. ................ 290/44 |
| 2011/0115301 | A1 * | 5/2011 | Bhavaraju et al. ............. 307/86 |

FOREIGN PATENT DOCUMENTS

| CN | 1524162 A | 8/2004 |
| CN | 101309012 A | 11/2008 |
| EP | 1 386 078 A1 | 4/2004 |
| FR | 2 823 381 A1 | 10/2002 |

* cited by examiner

*Primary Examiner* — Jared Fureman
*Assistant Examiner* — Alfonso Perez Borroto (57) ABSTRACT A converter device (for power conversion in e.g. a power plant such as a wind turbine is disclosed. An individual controller is provided for each phase of an electrical output power of the converter. If a voltage of one phase is indicated as being out of a predetermined voltage band, an active current of this phase is set to zero and optionally a reactive component of this phase is set to a value that depends on the indicated voltage.

18 Claims, 3 Drawing Sheets

CONVERTER DEVICE AND METHOD FOR CONVERTING ELECTRICAL POWER

CROSS REFERENCE TO RELATED APPLICATIONS

This application claims priority of European Patent Office application No. 10000320.1 EP filed Jan. 14, 2010, which is incorporated by reference herein in its entirety.

FIELD OF THE INVENTION

The present invention relates to the field of converter devices for converting input power into an electrical output power. In particular, the present invention relates to the field of converter devices for wind turbines.

ART BACKGROUND

There are known energy generating devices, which provide a varying power to an electricity network to which they are coupled. For example, a wind turbine provides less power for lower wind speeds. Another example is a solar energy plant, the output power of which depends on the availability and intensity of sunlight. The varying power may lead to voltage disturbances in the electricity network. Further, consumers which take power out of the electricity network may generate disturbances in the electricity network. Other possible faults are lightning, short circuits, etc.

EP 1 386 078 B1 discloses a method for operation of a wind energy installation so as to provide a wind turbine or a wind park capable of reducing or at least not significantly increasing the undesired variations of the voltage in an electricity network compared to a situation without the wind turbine. The wind energy installation has an electrical generator, which can be driven by a rotor in order to emit electrical power to an electrical network with a wattless component being fed into the electrical network. The wattless component is predetermined by a phase angle $\phi$, which describes an angle between the current and the voltage of the electrical volt amperes that are fed in, wherein the phase angle $\phi$ is varied as a function of the magnitude of at least one voltage, which is detected in the network, such that the phase angle is unchanged provided that the network voltage is between a predetermined lower threshold value and a predetermined upper threshold value, with the lower voltage value being less than a nominal voltage value and the predetermined upper voltage value being greater than a predetermined nominal voltage value. If the predetermined upper voltage value is exceeded or the predetermined lower voltage value is undershot, the magnitude of the phase angle arises as the voltage arises or falls further.

In view of the above described situation, there exists a need for an improved converter device that enables to accommodate voltage variations in an electricity network.

SUMMARY OF THE INVENTION

This need may be met by the subject-matter according to the independent claims. Advantageous embodiments of the herein disclosed subject-matter are described by the dependent claims.

According to a first aspect of the invention, there is provided a converter device for converting an input power (106) to an electrical output power, wherein the electrical output power has at least two phases. The converter device according to the first aspect comprises a voltage input for receiving a voltage signal for each of the at least two phases, the voltage signal being indicative of a voltage of the respective phase. Further, the converter device comprises an individual controller for each of the at least two phases, wherein each controller is configured for setting the active current to zero if the voltage of the respective phase is outside a predetermined voltage band. Such a predetermined voltage band is sometimes referred to as dead band. According to an embodiment, the electrical system, e.g. the power plant comprises a neutral line in addition to the output at which the electrical current is provided.

The voltage signal may be generated in any suitable way. For example, according to an embodiment, the voltage signal is derived from the electrical output provided by the converter device in each of the at least two phases. According to another embodiment, the voltage which is indicated by the voltage signal is the voltage of the respective phase in an electricity network to which the converter is coupled.

According to an embodiment, the converter device is configured for receiving a mechanical input power. For example, according to an embodiment, a converter device may include a doubly fed induction generator, e.g. of the type known from U.S. Pat. No. 6,448,735 B1.

According to another embodiment, the input power is an electrical input power. In other words, according to this embodiment, the converter device is configured for receiving an electrical input power. To this end, the converter device may comprise at least one converter, e.g. a frequency converter, for converting electrical input power into electrical output power. Since in this case the converter device is operates only on the electrical side, it is also referred to herein as electrical converter device.

According to an embodiment, the converter device is a converter device of a wind turbine. According to a further embodiment, the converter device is an electrical converter device of a wind turbine and is thus configured for converting an electrical input power generated by a generator of the wind turbine into an electrical output power.

Generally, the electrical power generated by any generator of electric energy may be preconverted so as to provide the electrical input power of the electrical converter device. The preconversion may be of any suitable type known in the art. For example, a rectifier may be coupled between the output of the generator and the power input of the converter device, which receives the electrical input power.

The predetermined voltage band may be fixedly pre-programmed in the converter device. According to another embodiment, the converter device comprises a control input for receiving at least one voltage band control signal. The converter device may be further configured for setting the predetermined voltage band in response to the received voltage band control signal.

The width of the predetermined voltage band may be in the range from 0% up to 20% of the rated voltage. According to another embodiment, the width of the predetermined voltage band is in the range from 5% to 15% of the rated voltage. According to embodiments, the percentages disclosed herein relate to respective +/−values such that the percentage values denote half of the respective interval. For example, if the rated voltage is 240 V and the width of the predetermined voltage band is 10% of the rated voltage, then the width of the predetermined voltage band amounts to +/−24 V, i.e. the predetermined voltage band is [rated voltage −24 V; rated voltage +24 V]. In other embodiments, the percentage values indicate the whole interval.

According to an embodiment, the predetermined voltage band is centered around the rated voltage. According to other embodiments, the predetermined voltage band is non-symmetrically disposed with regard to the rated voltage.

According to a further embodiment of the first aspect, each of the individual controllers is configured for setting a reactive component, e.g. a reactive current, of its phase, depending on the voltage signal corresponding to its phase. According to an embodiment, setting the reactive component is performed only if the voltage indicated by the voltage signal is outside the predetermined voltage band. According to still another embodiment, setting the reactive component is performed irrespective of the voltage indicated by the voltage signal, i.e. inside and outside the predetermined voltage band. In the aforementioned cases, a reactive component of the electrical output power is set for each phase separately depending on the voltage signal for this phase under consideration.

Generally herein, the term "setting" is to be interpreted in a broad sense. For example setting a certain quantity (e.g. an active component, a reactive component, etc.) depending on a voltage signal includes e.g. setting the quantity depending on the voltage signal at defined time intervals, varying the quantity in response to a varying voltage signal, etc. In particular "setting a reactive component depending on a voltage signal" includes e.g. setting the reactive component depending on the voltage signal at defined time intervals, varying the reactive component in response to a varying voltage signal, etc.

According to an embodiment, the reactive component is a reactive current. Other examples of reactive components are reactive power, phase angle or power factor. These reactive components are well-known to those skilled in the art and are not discussed in further detail.

According to an embodiment, each controller is configured for setting the reactive component of its phase, so as to drive the voltage of its phase towards the predetermined voltage band. Further, according to another embodiment, the controller may be configured for varying the reactive component in a stepwise manner in response to the voltage signal, even if the voltage signal is a continuously varying signal. For example, in an embodiment, if the voltage of the respective phase reaches the boundary of the predetermined voltage band, the reactive component, e.g. the reactive current, may be set to a predetermined value. According to other embodiments, the controller of at least one phase is configured for varying the reactive component continuously over the boundary of the predetermined voltage band as a function of the voltage signal.

According to a further embodiment, the electrical output power has a number of n phases and the converter device has a number of n of said individual controllers. Further, according to an embodiment of the first aspect, the converter device comprises a selector configured for selecting n−1 of the individual controllers out of the n controllers. Further, the selector is configured for outputting a selector signal to the selected n−1 individual controllers. In this embodiment, at least one of the individual controllers of the converter device is configured for setting, in response to the selector signal, the reactive component of its phase depending on the voltage signal of its phase and independent of any other phase, e.g. independent of the voltage signals and or the reactive current of any other phase.

Hence the selector selects, by means of the selector signals, n−1 controllers which vary the reactive component of its phase independent of any other phase. According to an embodiment, the remaining individual controller is configured for setting the reactive component of its phase, so as to reduce or even minimize a current on a neutral line of the converter device. This allows for a small neutral current, while the reactive component of each of the selected phases is controlled independently of the other phases.

According to other embodiments, there is provided not only a single remaining controller, which takes into account the currents on the other phases. Rather, according to an embodiment, if the electrical output power has a number of n phases the selector device may be configured for selecting n−x of the individual controllers or of the n controllers for outputting a selector signal to the selected n−x individual controllers which in response hereto set the reactive component of its phase depending on the voltage signal of its phase and independent of the voltage signals of any other phase. Accordingly, each of the other x individual controllers may set the reactive component of its phase depending on the voltage signal of its phase and depending on at least one quantity (e.g. reactive component, voltage, active current, etc.) of the other phases. For example, x individual controllers which take into account the currents of the n−x independently controlling controllers may be made aware of the fact that they are not selected by the selector e.g. by receiving, at the control input, a respective non-selection signal or by simply not receiving a selector signal mentioned before.

It should be mentioned that whenever a controller takes into account current signals of its own phase or of another phase, a respective current measuring unit is provided in order to measure a current signal representative of the current of the respective phase which is taken into account by the controller.

According to an embodiment of the first aspect, at least one of the controllers is configured for effecting a predetermined change of reactive component per voltage unit of a change in the voltage indicated by the voltage signal, wherein the predetermined change of reactive component per voltage unit defines a reactive component gradient, hereinafter referred to as "gradient" for short. According to a further embodiment, the at least one controller is configured for controlling the reactive component of its phase according to an in-band gradient if the voltage indicated by the voltage signal is inside the predetermined voltage band and for controlling the reactive component of its phase according to an out-of-band gradient if the voltage indicated by the voltage signals outside the predetermined voltage band.

According to a further embodiment, the in-band gradient is different from the out-of-band gradient. According to a further embodiment, the gradient is specified as a percentage value, wherein for example a value of 2% reactive component gradient means that a 1% change in the voltage indicated by the voltage signal results in a 2% change in the reactive component. It should be noted that according to an embodiment, the slope of the gradient is such that the voltage of the respective phase is driven towards the predetermined voltage band.

According to an embodiment the in-band gradient is constant, i.e. independent of the voltage signal within the predetermined voltage band. According to another embodiment, the out-of-band gradient is constant, i.e. independent of the voltage signal outside the predetermined voltage band.

According to an embodiment, the actual value of the reactive component at the boundary of the predetermined voltage band (according to the in-band control of the reactive component) is used as starting point for the application of the out-of-band gradient. According to another embodiment, the controller is configured for setting the value of the reactive component at the boundary of the predetermined voltage band to a predetermined value, e.g. zero amperes. This may result in a change of the reactive component at the boundary of the predetermined voltage band in a stepwise manner.

According to an embodiment of the first aspect, the converter device comprises a control input for receiving a gradient control signal, wherein each of the individual controllers is configured for setting at least one of the out-of-band gradient and the in-band gradient of the controller in response to the gradient control signal.

According to a second aspect of the herein disclosed subject-matter, a power plant is provided, the power plant comprising a converter device according to the first aspect or an embodiment thereof.

According to an embodiment, the power plant further comprises a power generator for generating the electrical input power. For example, according to an embodiment, the power generator is a electrical generator of a wind turbine. According to another embodiment, the power generator is a solar energy module. However, it should be understood that any power generator may be used with the converter device according to the herein disclosed subject-matter.

According to a further embodiment of the second aspect, the power plant comprises a power plant controller for providing at least one control signal to the individual controllers of the converter device, e.g. for setting a reactive component gradient in the individual controllers of the converter device or for selecting one or more of the individual controllers as discussed above.

Controlling the out-of-band reactive component gradient may allow e.g. for adaption of the reactive current contribution outside the predetermined voltage band to a network impedance of the electricity network. According to an embodiment, the power plant controller is be configured for automatic optimisation of the out-of-band gradient and/or the in-band gradient.

According to a third aspect of the herein disclosed subject-matter, a method for converting an input power to an electrical output power is provided, the method comprising (i) receiving a voltage signal for each of the at least two phases, the voltage signal being indicative of a voltage of the respective phase, and (ii) setting the active current of each of the at least two phases to zero if the voltage of the respective phase is outside a predetermined voltage band.

According to an embodiment of the third aspect, the method comprises setting a reactive component of at least one of the at least two phases depending on the voltage signal corresponding to this phase.

According to a further embodiment of the third aspect, the method comprises setting the reactive component of a subset of the at least two phases depending on the voltage signal of the respective phase and independent of the voltage signals and/or currents of any other phase. According to a further embodiment, for the remaining phases, which are not included in the above mentioned subset of phases, the reactive component is set depending on at least one quantity (e.g. reactive component) of at least one of the other phases.

According to a further embodiment of the third aspect, the reactive component of each of the at least two phases is set depending on the voltage signal of the respective phase and independent of the voltage signals or reactive components of any other phase.

According to a further embodiment of the third aspect, the reactive component is set according to an in-band gradient if the voltage indicated by the voltage signal is inside a predetermined voltage band and the reactive component of each phase is set according to an out-of-band gradient if the voltage indicated by the voltage signal is outside the predetermined band for this phase.

According to an embodiment of the third aspect, the reactive component is varied continuously over the boundary of the predetermined voltage band. According to another embodiment, the reactive component is varied in a stepwise manner over the boundary of the predetermined voltage band, wherein the starting point outside the predetermined voltage band may be predetermined.

According to a fourth aspect of the herein disclosed subject-matter, a method for operating a power plant controller is provided, the method comprising providing a control signal to the individual controllers of a converter device, wherein the converter device is configured for converting an input power to an electrical output power and comprises one of said individual controllers for each phase of the electrical output power. The method further comprising setting a reactive component gradient that is used by the converter device for controlling a reactive component of at least one phase if a voltage of the respective phase is outside a predetermined voltage band.

According to a fifth aspect of the herein disclosed subject-matter, a computer readable medium is provided, wherein on the computer readable medium there is stored a computer program for setting a active current of each of at least two phases in a converter device, the computer program, when being executed by data processor, is adapted for controlling or for carrying out the method as set forth in the third aspect or an embodiment thereof.

According to a sixth aspect of the herein disclosed subject-matter a program element is provided, the program element being configured for setting an active current of each of at least two phases of an electrical output power of a converter device, the program element, when being executed by a data processor, is adapted for controlling or for carrying out the method as set forth in the third aspect or an embodiment thereof.

According to a seventh aspect of the herein disclosed subject-matter, a computer readable medium is provided, wherein on the computer readable medium there is stored a computer program for setting a reactive component gradient for at least one phase of a converter device, the computer program, when being executed by data processor, is adapted for controlling or for carrying out the method as set forth in the fourth aspect or an embodiment thereof.

According to a eighth aspect of the herein disclosed subject-matter a program element is provided, the program element being configured for setting a reactive component gradient for at least one phase of a converter device, the program element, when being executed by data processor, is adapted for controlling or for carrying out the method as set forth in the fourth aspect or an embodiment thereof.

As used herein, reference to a program element and/or a computer readable medium is intended to be equivalent to a reference to a computer program containing instruction for controlling a computer system to coordinate the performance o the above described methods.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the invention may also be realized in a hybrid form, i.e. in a combination of software modules and hardware modules.

In the following, there will be described exemplary embodiments of the subject-matter disclosed herein with reference to a converter device and a method for converting an input power into an electrical output power. It has to be pointed out that of course any combination of features relating to different aspects of the herein subject-matter is also possible. In particular, some embodiments have been described with reference to apparatus type claims whereas other embodiments have been described with reference to method type claims. However, a person skilled in the art will gather from the above and the following description that, unless otherwise notified, in addition to any combination of features belonging to one aspect also any combination between features relating to different aspects or embodiments, for example even between features of the apparatus type claims and the features of the method type claims, as well as between features relating to the converter device and features relating to a power plant is considered to be disclosed with this application.

The aspects and embodiments defined above and further aspects and embodiments of the herein disclosed subject-matter are apparent from the examples to be described hereinafter and are explained with reference to the drawings but to which the invention is not limited.

BRIEF DESCRIPTION OF THE DRAWINGS

FIG. 1 shows schematically a power plant in accordance with embodiments of the herein disclosed subject-matter.

DETAILED DESCRIPTION

The illustration in the drawings is schematic. It is noted that in different figures, similar or identical elements are provided with the same reference signs or with reference signs, which are different from the corresponding reference signs only within an appended character.

FIG. 1 shows schematically a part of the power plant 100 according to embodiments of the herein disclosed subject-matter. The power plant 100 comprises a converter device 102 and a power generator 104.

The converter device 102 is configured for converting an electrical input power 106 supplied by the power generator 104 into an electrical output power, indicated at 108 in FIG. 1. The electrical output power 108 has at least two phases, e.g. three phases 110a, 110b, 110c as shown in FIG. 1. The phases 110a, 110b, 110c of the electrical output power 108 are couplable with respective phases L1, L2, L3 of an electricity network which is indicated at 112 in FIG. 1. Coupling of the converter device 102 with the electricity network 112 may be performed by any suitable means, e.g. switch components 114a, 114b, 114c. The switch components 114a, 114b, 114c together may form a main switch 114 in one embodiment.

According to an embodiment, an individual controller 116a, 116b, 116c is provided for each of the phases 110a, 110b, 110c.

Further, the converter device comprises a voltage input for receiving a voltage signal for each of the phases 110a, 110b, 110c. According to an illustrative embodiment shown in FIG. 1, each controller has a voltage input 118a, 118b, 118c for receiving, a voltage signal 120a, 120b, 120c of the corresponding phase 110a, 110b, 110c. According to an embodiment, the individual voltage inputs 118a, 118b, 118c of the controllers together form the "voltage input" of the converter device. Each voltage signal 120a, 120b, 120c is indicative of a voltage of the respective phase of the electric output power 108. Each voltage signal may be part of a feedback signal which includes the voltage signal and at least on further quantity, e.g. a current signal indicative of a current of the phase. This current indicated by the current signal may be an active current, a reactive current or a total (complex) current including the active current and the reactive current.

Each of the individual controllers 116a, 116b, 116c is configured for setting the active current of the electrical output power 108 to zero if the voltage of the respective phase, indicated by the voltage signals 120a, 120b, 120c, is outside a predetermined voltage band.

According to an embodiment, the power plant comprises a neutral line (not shown in FIG. 1) in addition to the phases of electrical output power, which carry the desired active and/or reactive power. In order to effect the setting of the active current to zero, according to an embodiment an individual converter 122a, 122b, 122c, e.g. a frequency converter, is provided for each phase. According to an embodiment shown in FIG. 1, each of the converters 122a, 122b, 122c has an input 124 which is configured for receiving the electrical input power 106 in the form of an alternating current. According to other embodiments, the converters 122a, 122b, 122c may be configured for receiving a direct current electrical input power. Further, the converters 122a, 122b, 122c comprise an output 126a, 126b, 126c for providing one of the phases 110a, 110b, 110c of the electrical output power 108. As shown in FIG. 1, the voltage of each phase 110a, 110b, 110c which is to be detected in the electricity network 112 may be measured at the respective output 126a, 126b, 126c of the individual converters 122a, 122b, 122c.

The power plant 100 further comprises a power plant controller 128 for providing control signals to the individual controllers 116a, 116b, 116c. The entirety of the control signals is denoted by 130 in FIG. 1 and may include a control signal for setting a desired power P with a respective power control signal 130a, a control signal for setting the power slope dP/dt, corresponding to a certain change in power per time unit, with a respective power slope control signal 130b and a control signal for setting a desired voltage Us with a respective voltage control signal 130c. Although the three exemplary control signals 130a, 130b, 130c are denoted with the same reference signs for each of the individual controllers 116a, 116b, 116c, it should be understood that these control signals may be equal for all of the individual controllers or may in part or all be different for the individual controllers 116a, 116b, 116c.

Each of the individual controllers 116a, 116b, 116c comprises a control input 131a, 131b, 131c for receiving the control signals 130, 130a, 130b, 130c. The controllers are configured for controlling in response to the control signals its associated converter 122a, 122b, 122c with respective converter control signals 132a, 132b, 132c and may optionally receive, according to an embodiment, feedback signals 134a, 134b, 134c from the converters.

The power plant 100 shown in FIG. 1 is part of a wind turbine, wherein the gears and the rotor of the wind turbine are coupled to the generator 104 for driving the generator 104, but are not shown in FIG. 1. In operation, the wind power plant controller 128 controls the voltages in each single phase 110a, 110b, 110c and will support the voltage in the electricity network by feed-in of reactive current into each single phase depending on the voltage level in each phase, which is indicated by the voltage signal 120a, 120b, 120c.

According to an embodiment, the power plant 100 operates inside a predetermined voltage band with a constant reactive power factor. According to an embodiment, if the voltage (which is indicated by the voltage signals 120a, 120b, 120c) leaves the predetermined voltage band (overshot or undershot) the active current of the respective phase will be set to zero and the reactive current will be varied as a function of the magnitude of the voltage of the respective phase, which is detected in the electricity network 112. It should be noted, that although the switch components 114a, 114b, 114c of the switch 114 are in an open state in FIG. 1, in operation, the switch components 114a, 114b, 114c will be closed, thereby coupling the power plant 100 to the electricity network 112.

In case of a network disturbance, where the voltage of one or more of the phases 110a, 110b, 110c leaves the predetermined voltage band (also referred to as a dead band), and if the power plant 100 delivers the demanded reactive current in each single phase, furthermore the active current can also be increased (and hence the phase angle between the voltage and the total current (active current plus reactive current) be decreased) in each single phase up to the limits of the converter.

According to an embodiment, the power that can be delivered by the converter is limited to a certain amount. For some converter types, the sum of the active current and the reactive current must be below this amount and hence the lower the active current, the higher can be the reactive current. However, these are limitations imposed by the design of the converter, which may vary widely with converter type and design.

According to an embodiment, the power plant 100 operates inside the voltage dead band with voltage control, which means that the power factor in each phase will be varied depending on the voltage in this phase so as to keep the voltage at a constant value, at least within certain limits, e.g. within the boundaries of the predetermined voltage band. If the voltage of one or more phases leaves the predetermined voltage band (overshot or undershoot), the power factor will be changed depending on the voltage in each phase in the network. According to an embodiment, the reactive current is changed by the respective controller 116a, 116b, 116c according to a predetermined gradient, inside the dead band and/or outside the dead band. In the following, the predetermined reactive current gradient inside the dead band is referred to as in-band gradient and the reactive current gradient outside the dead band is referred to as out-of-band gradient. According to an embodiment, the in-band gradient and the out-of-band gradient are different.

The reactive current provided at the output 126a, 126b, 126c of the converter 120a, 120b, 120c is, according to an embodiment, limited to the rated current of the converter. If the voltage indicated by the voltage signal 120a, 120b, 120c leaves the dead band (overshot or undershoot), the reactive current will follow the predetermined out-of-band gradient. According to an embodiment, the start value for the reactive current at the boundary of the dead band is zero amperes. This means that in this embodiment the reactive current jumps from the previous value inside the dead band to the predetermined start value for reactive current control according to the out-of-band gradient outside the dead band. Herein, the previous value inside the dead band is set according to the voltage control inside the dead band.

Operating parameters such as the in-band gradient, the out-of-band gradient and the settings of the above mentioned control signals, etc. may be stored in a memory 136a, 136b, 136c of the respective controller 116a, 116b, 116c. The respective settings in the memory 136a, 136b, 136c may be at least partly fixedly stored and/or may be variable, e.g. by the power plant control 128. According to an embodiment, the power plant control 128 may continuously update the respective settings depending on actual properties such as the impedance of the electricity network. The impedance of the electricity network (grid network) may be determined by a targeted injection of a reactive power for a short time and measurement of relevant parameters of the electricity network.

According to other embodiments such an update of the respective settings by the power plant control 128 may be initiated manually.

Figure 2A:
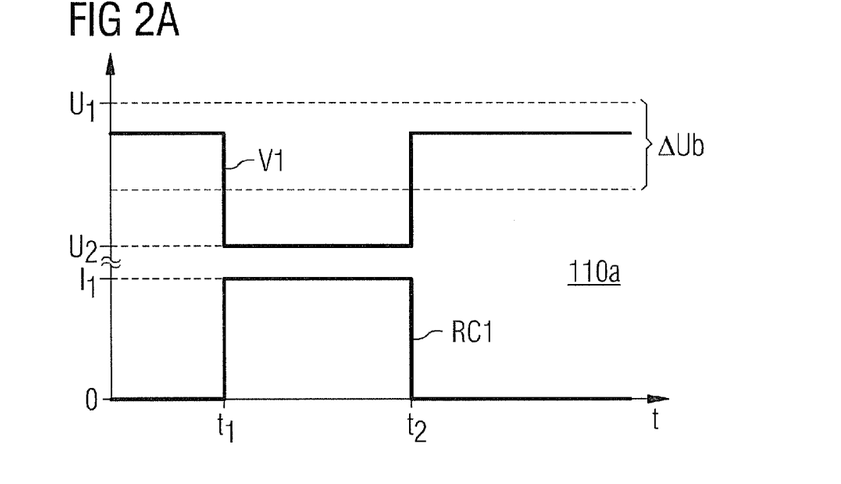
FIGS. 2A, 2B and 2C schematically show a time evolution of exemplary voltage signals for a converter device having three phases and the respective response of the converter device in the reactive component of the three phases according to embodiments of the herein disclosed subject-matter.
Figure 2B:
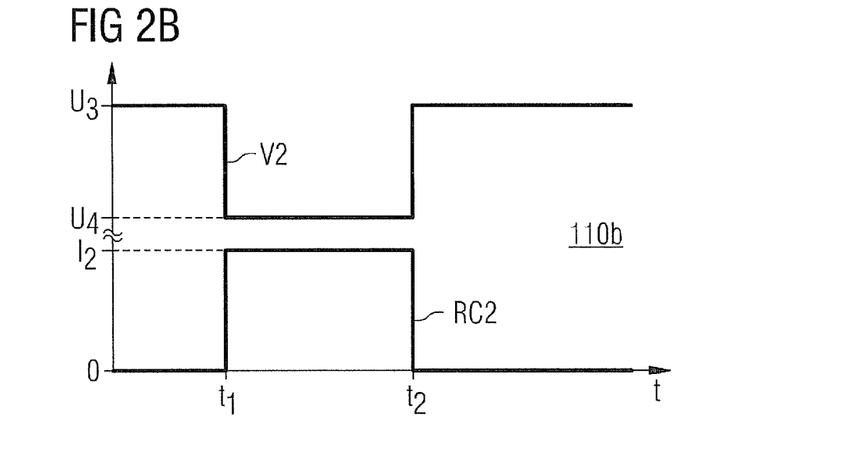
Figure 2C:
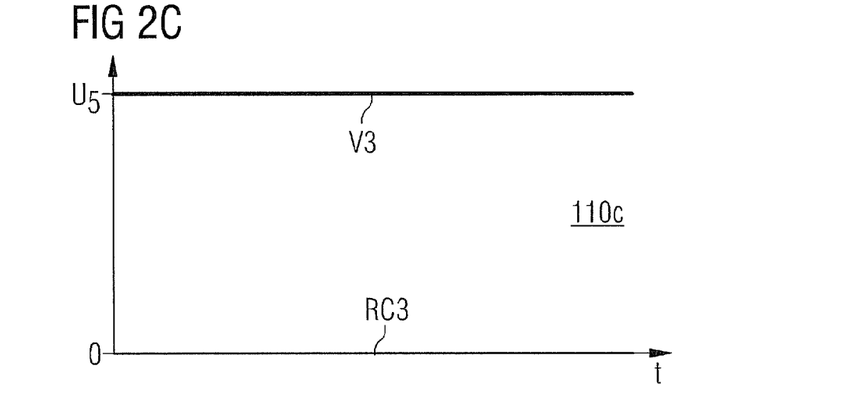

FIG. 2A, FIG. 2B and FIG. 2C respectively show the evolution of the voltage and the reactive current of the power plant 100 of FIG. 1 for the three phases 110a, 110b, 110c over time t.

In FIG. 2A the voltage V1 of the first phase 110a stays at a level U1. At t=t1, a disturbance occurs and the voltage V1 drops from U1, which is inside the predetermined voltage band ΔUb, to U2 which is outside the predetermined voltage band. In response to the voltage drop in the phase 110a, the converter device 102 and in particular the individual controller 116a of the first phase 110a raises the reactive current RC1 of the first phase 110a from zero (0) to a level I1, which is determined by the controller 116a according to the actual value of the out-of-band gradient and the actual predetermined value of the reactive current at the boundary of the predetermined voltage band. At t=t2 the voltage V1 is again inside the predetermined voltage band ΔUb and the reactive current RC1 is set to zero by the converter device 102.

In FIG. 2B, the voltage V2 of the second phase 110b drops at t1 from a value U3 inside the predetermined voltage band to a value U4 outside the predetermined voltage band (the predetermined voltage band is not shown in FIG. 2B). In response hereto the converter device 102 raises the reactive current RC2 of the second phase 110b to a value I2. At t=t2 the voltage V2 is again inside the predetermined voltage band and the reactive current RC2 is set to zero by the converter device 102.

In the third phase 110c the voltage V3 remains within the predetermined voltage band (not shown in FIG. 3) at a level U5 over the whole time interval of consideration. Accordingly, due to the individual control of the phases, the reactive current RC3 is maintained at zero for the third phase 110c. According to other embodiments, the reactive current RC3 is unequal to zero if the voltage indicated by the voltage signal is inside the predetermined voltage band.

Figure 3:
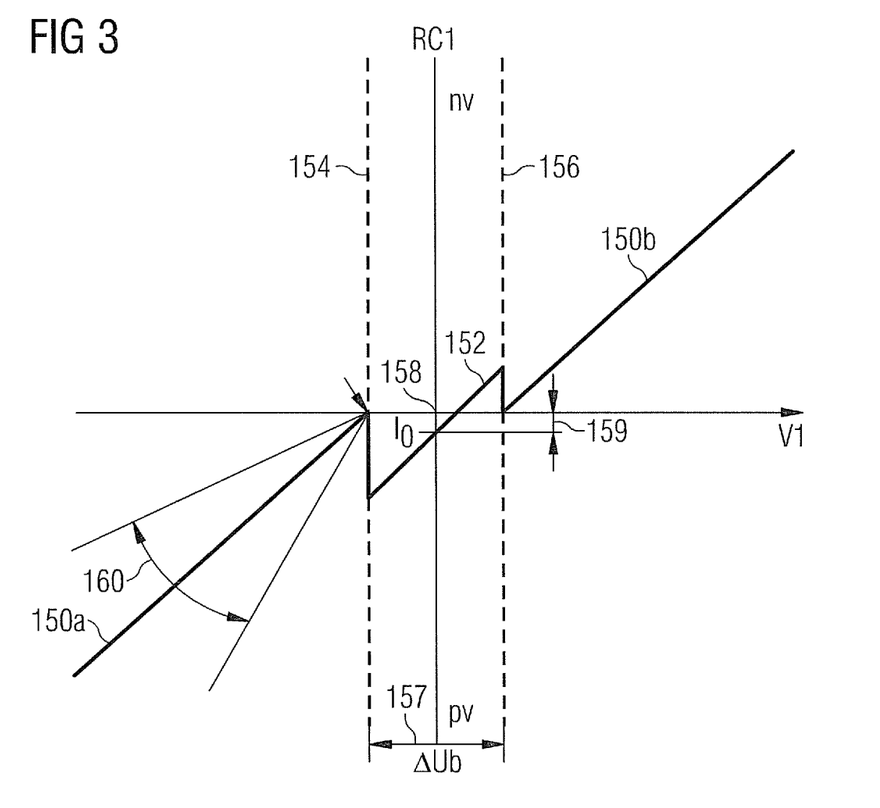
FIG. 3 schematically shows the changes in reactive component versus voltage signal for an exemplary phase of a converter device in according with embodiments of the herein disclosed subject-matter.

FIG. 3 exemplarily illustrates in-band control and out-of-band control of the reactive current according to embodiments of the herein disclosed subject matter. It should be understood that instead of the reactive current any other reactive component may be taken into account for controlling the voltage supplied by the converter device in the individual phases.

FIG. 3 shows the out-of-band gradient 150a, 150b for the reactive current RC1 for the first phase 110a, the out-of-band gradient determining the amount of change in reactive current per unit change of voltage V1 indicated by the voltage signal 120a of FIG. 1. The in-band gradient for the reactive current RC1 and the voltage V1 is indicated at 152 in FIG. 3. Positive values of the reactive current RC1 are indicated at pv in FIG. 3 wherein negative values are indicated at nv in FIG. 3. Further illustrated in FIG. 3 is the predetermined voltage band ΔUb with a lower boundary 154 and an upper boundary 156 of the predetermined voltage band. According to an embodiment, the width 157 of the predetermined voltage band ΔUb is 5% of the rated value of the voltage V1. According to other embodiments, the width 157 may be set to any value in the interval between 0% and 20% of the rated voltage. According to other embodiments, other values are possible.

According to an embodiment, the in-band gradient 152 is offset from the origin 158 which is defined by voltage V1=rated voltage and reactive current RC1=0. The offset 159 of the in-band gradient is defined as the reactive current Io of the gradient curve 152 at the rated voltage.

The actual value of the in-band gradient 152 and the actual value of the out-of-band gradient 150a, 150b are different in an embodiment. According to an embodiment, the value for at least one of the in-band gradient 152 and the out-of-band gradient 150a, 150b is temporally fixed. According to another embodiment, the value for at least one of the in-band gradient 152 and the out-of-band gradient 150a, 150b is changeable, e.g. by respective gradient control signals from e.g. the power plant controller 128 shown in FIG. 1. According to an embodiment, the out-of-band gradient is changeable within a predetermined gradient interval, indicated at 160 in FIG. 3, e.g. within the interval from 1% to 4%. Herein, a gradient of e.g. x % defines the reactive current RC1 to be changed by x % for a detected 1% change of the voltage V1. It should be understood that the reactive current and the voltage of the first phase 110a are referenced here only for illustrative purposes.

In a similar manner the in-band gradient 152 may be defined and may be settable to a value in the same gradient interval or in a different gradient interval.

According to embodiments of the invention, any suitable component of the power plant or of the converter device, e.g. the individual controllers, is provided in the form of respective computer program products which enable a processor to provide the functionality of the respective elements as disclosed herein. According to other embodiments, any component of the power plant or of the converter device, e.g. the individual controllers, may be provided in hardware. According to other—mixed—embodiments, some components may be provided in software while other components are provided in hardware.

The functionality provided by embodiments of the herein disclosed subject matter may be imposed on an existing converter device/existing power plant controller by means of a software update, firmware update, or the like.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the present invention one can state:

It is described a converter device for power conversion in e.g. a power plant such as a wind turbine. An individual controller is provided for each phase of an output power of the converter device. If a voltage of one phase is indicated as being out of a predetermined voltage band, an active current of this phase is set to zero and optionally a reactive component of this phase is set to a value that depends on the indicated voltage.

According to an embodiment the converter device is configured for converting an electrical input power to an electrical output power. According to another embodiment, the converter device is configured for converting a mechanical input power to a electrical output power.

According to an embodiment, at least one of the individual controllers is configured for setting or varying the reactive component of its phase depending on the reactive components of the other phases. For example, according to an embodiment, the at least one individual controller may be configured for varying the reactive component of its phase depending on the reactive components of the other phases in response to a non-selecting signal or in response to not receiving the afore mentioned selector signal. Such embodiments may allow for selection of a good compromise between individual and independent control of the phases of the electrical output power and a low neutral current.

According to a further embodiment, the electrical output power has a number of n phases and the converter device has a number of n individual controllers, wherein each of the individual controllers is configured for varying, in response to the selector signal, the reactive component of its phase depending on the voltage signal of its phase and independent of the voltage signals of any other phase. Additionally or alternatively, the individual controllers may be configured for a varying, in response to the selector signal, the reactive component of its phase depending on the voltage signal of its phase and independent of the currents on the other phases.

According to embodiments of the herein disclosed subject matter, especially in case of asymmetric faults the voltage support is done only in the faulty phases. Therefore, the stability of the electricity network is supported because the healthy voltages will not overshot due to a feed-in of reactive current in all phases. Further, embodiments of the herein disclosed subject matter allow for a more accurate support of the voltages following the demands since the requirements are in some embodiments fulfilled in each phase.

Since each single phase is controlled, the reaction time to provide the required reactive current may be reduced compared to known scenarios.

The load of the converters and hence of the converter device will be limited to use the full potential of the reactive current feed-in. Further, according to embodiments it is possible to realize reaction times, especially during the start point of the fault of the electricity network (grid), where it will take a short time to determine the depth of the voltage dip.

The feed-in of active current, after the power plant delivers the demanded reactive current, will e.g. in case of a wind power plant reduce the mechanical load of the wind turbine.

Further, the stability of the electricity network (grid) will be supported by feeding-in of active current Embodiments of the herein disclosed subject matter result in a more stable electricity network operation of the power plant. The voltage will be more constant and therefore the influence on the electricity network especially during changes in the wind speed will be reduced or even minimized.

The voltage setpoint can be set to a value which is (slightly) higher than the rated voltage in order to compensate for some normal reactive power consumers in the collector grid or in the cables and transformers: Thereby the losses in the power plant can be reduced. Further, switching operations of a tab changer at the transformer station will be reduced. Thereby, the life time of the tab changer will be increased.

The invention claimed is:

1. A converter device for converting an input power to an electrical output power having at least two phases, the converter device comprising:

a voltage input for receiving a voltage signal for each of said at least two phases, said voltage signal being indicative of a voltage of the respective phase of the electrical output power;

an individual controller for each of said at least two phases, each controller sets an active current to zero when the voltage of the respective phase is outside a predetermined voltage band;

a frequency converter is provided for each phase in order to effect the setting of the active current to zero, the frequency converter comprises an input for receiving the input power and an output for outputting the respective phase of the output power, wherein a reactive component of the electrical output power is set for each phase separately depending on the voltage signal for this phase under consideration, wherein the reactive component is a reactive current, wherein each individual controller includes a control input for receiving a control signal from a power plant controller, wherein the individual controller controls, based on the control signal, the respective frequency converter, wherein the predetermined voltage band is preprogrammed in the individual controller or the predetermined voltage band is set with the individual controller after receiving the control signal from the power plant controller, wherein at least one of said individual controllers implements a predetermined change of reactive component per voltage unit of a change in the voltage indicated by the voltage signal, said predetermined change of reactive component per voltage unit defining a reactive component gradient, and wherein said at least one controller controls the reactive component of its phase according to an in-band reactive component gradient if the voltage indicated by the voltage signal is inside the predetermined voltage band and for controlling the reactive component of its phase according to an out-of-band reactive component gradient if the voltage indicated by the voltage signal is outside the predetermined voltage band.

2. The converter device according to claim 1, wherein each of said individual controllers is configured for setting a reactive component of its phase depending on the voltage signal corresponding to its phase.

3. The converter device according to claim 2,
said electrical output power having a number of n phases;
said converter device having a number of n of said individual controllers,
a selector configured for selecting n-1 of said individual controllers out of said n controllers and for outputting a selector signal to said selected n-1 individual controllers;
wherein at least one of said individual controllers is configured for setting, in response to said selector signal, the reactive component of its phase depending on the voltage signal of its phase and independent of the voltage signals of any other phase.

4. The converter device according to claim 3,
wherein at least one individual controller is configured for setting the reactive component of its phase depending on the reactive components of the other phases, at least in response to not receiving said selector signal.

5. The converter device according to claim 2,
said electrical output power having a number of n phases;
said converter device having a number of n of said individual controllers,
wherein each of said individual controllers is configured for setting, in response to said selector signal, the reactive component of its phase depending on the voltage signal of its phase and independent of the voltage signals of any other phase.

6. The converter device according to claim 1,
wherein the in-band reactive component gradient is different from the out-of-band reactive component gradient.

7. The converter device according to claim 2,
wherein at least one controller is configured for changing the reactive component at a boundary of said predetermined voltage band in a stepwise manner.

8. A Power plant comprising
a converter device according to claim 1.

9. The Power plant according to claim 8, further comprising a power plant controller for providing a control signal to the individual controllers of the converter device for setting a reactive component gradient in the individual controllers of the converter device.

10. A method for converting an input power to an electrical output power having at least two phases, the method comprising:
receiving a voltage signal for each of said at least two phases, said voltage signal being indicative of a voltage of the respective phase of the electrical output power;
comparing, among individual controllers for each of said at least two phases, the voltage of the respective phase measured from an output of a respective frequency converter to a predetermined voltage band; and
setting the active current of each of said at least two phases to zero when the voltage of the respective phase is outside the predetermined voltage band,
wherein the frequency converter is provided for each phase in order to effect the setting of the active current to zero, the frequency converter comprises an input for receiving the input power and an output for outputting the respective phase of the output power,
wherein each individual controller includes a control input for receiving a control signal from a power plant controller,
wherein the individual controller controls, based on the control signal, the respective frequency converter, an
wherein the predetermined voltage band is preprogrammed in the individual controller or the predetermined voltage band is set with the individual controller after receiving the control signal from the power plant controller,
wherein at least one of said individual controllers is configured for effecting a predetermined change of reactive component per voltage unit of a change in the voltage indicated by the voltage signal, said predetermined change of reactive component per voltage unit defining a reactive component gradient,
wherein said at least one controller is configured for controlling the reactive component of its phase according to an in-band reactive component gradient if the voltage indicated by the voltage signal is inside the predetermined voltage band and for controlling the reactive component of its phase according to an out-of-band reactive component gradient if the voltage indicated by the voltage signal is outside the predetermined voltage band, and
wherein the in-band reactive component gradient is different from the out-of-band reactive component gradient.

11. A method for operating a power plant controller, the method comprising:

providing a control signal to a controller of a converter device, wherein the converter device is configured for converting an input power to an electrical output power;

the control signal being configured for setting within the converter device a reactive component gradient that is used by the converter device for controlling a reactive component of at least one phase when a voltage of the respective phase of the electrical output power is outside a predetermined voltage band.

12. The converter device according to claim 1, wherein the control signal represents a signal for controlling a desired power.

13. The converter device according to claim 1, wherein the control signal represents a signal for controlling a power slope, a certain change in power per time unit.

14. The converter device according to claim 1, wherein the control signal represents a signal for controlling a desired voltage.

15. The method for converting an input power to an electrical output power having at least two phases according to claim 10, wherein the predetermined voltage band provided is within a range of 0% to 20% of a predetermined voltage band of the respective frequency converter.

16. The method for converting an input power to an electrical output power having at least two phases according to claim 15, wherein the predetermined voltage band provided is 5% of the predetermined voltage band of the respective frequency converter.

17. The method for converting an input power to an electrical output power having at least two phases according to claim 11, wherein the predetermined voltage band provided is within a range of 0% to 20% of a predetermined voltage band of the respective frequency converter.

18. The method for converting an input power to an electrical output power having at least two phases according to claim 17, wherein the predetermined voltage band provided is 5% of the predetermined voltage band of the respective frequency converter.

* * * * *